(12) United States Patent
Kang et al.

(10) Patent No.: US 9,870,095 B2
(45) Date of Patent: Jan. 16, 2018

(54) TOUCH ANALOG FRONT END AND TOUCH SENSOR CONTROLLER HAVING THE SAME

(71) Applicant: Samsung Electronics Co., Ltd., Suwon-si (KR)

(72) Inventors: Sanghyub Kang, Yongin-si (KR); Hojin Park, Suwon-si (KR); Kyunghoon Lee, Seoul (KR); Jungho Lee, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 113 days.

(21) Appl. No.: 14/851,775

(22) Filed: Sep. 11, 2015

(65) Prior Publication Data

US 2016/0098150 A1  Apr. 7, 2016

(30) Foreign Application Priority Data

Oct. 6, 2014 (KR) ........................ 10-2014-0134516

(51) Int. Cl.
*G06F 3/044* (2006.01)
*G06F 3/041* (2006.01)
*G06F 1/16* (2006.01)
*G06F 3/01* (2006.01)

(52) U.S. Cl.
CPC ............ *G06F 3/0418* (2013.01); *G06F 1/163* (2013.01); *G06F 3/011* (2013.01); *G06F 3/044* (2013.01); *G06F 3/0412* (2013.01); *G06F 2203/04101* (2013.01)

(58) Field of Classification Search
CPC ........ G06F 1/163; G06F 3/011; G06F 3/0412; G06F 3/044; G06F 3/0418; G06F 2203/04101
See application file for complete search history.

(56) References Cited

U.S. PATENT DOCUMENTS

| | | | |
|---|---|---|---|
| 2010/0110040 A1* | 5/2010 | Kim | G06F 3/0412 345/174 |
| 2012/0200524 A1 | 8/2012 | Vallis et al. | |
| 2012/0256869 A1* | 10/2012 | Walsh | G06F 3/0416 345/174 |
| 2012/0310572 A1 | 12/2012 | Jordan | |
| 2013/0300690 A1* | 11/2013 | Yang | G06F 3/0416 345/173 |
| 2014/0078096 A1* | 3/2014 | Tan | G01R 27/2605 345/174 |

\* cited by examiner

*Primary Examiner* — Towfiq Elahi
(74) *Attorney, Agent, or Firm* — Onello & Mello, LLP

(57) ABSTRACT

A touch analog front-end (AFE) and a touch sensor controller (TSC) are provided. The touch AFE includes a transmitter configured to charge a touch panel and a receiver configured to sense the touch panel. The receiver includes a charge-to-voltage (C2V) converter configured to convert an amount of change of capacitance received from the touch panel into a voltage signal, a filter configured to filter a noise from the voltage signal, resulting in a filtered voltage signal, an integrator configured to accumulate the filtered voltage signal, and a polarity detection circuit configured to monitor the filtered voltage signal and to control the integrator to invert a polarity of the filtered voltage signal when it is negative.

20 Claims, 14 Drawing Sheets

FIG. 3A
FIG. 3B
FIG. 3C
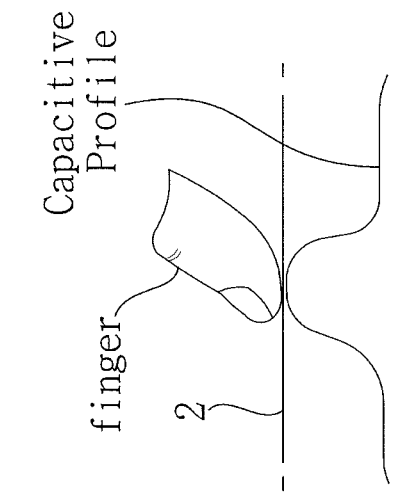
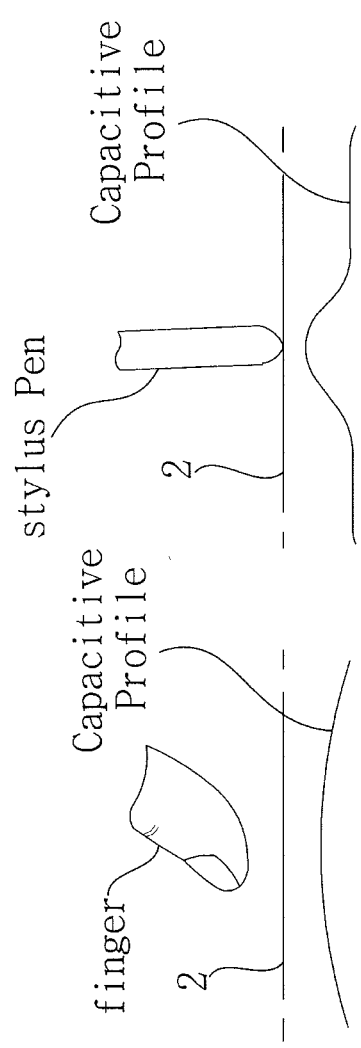

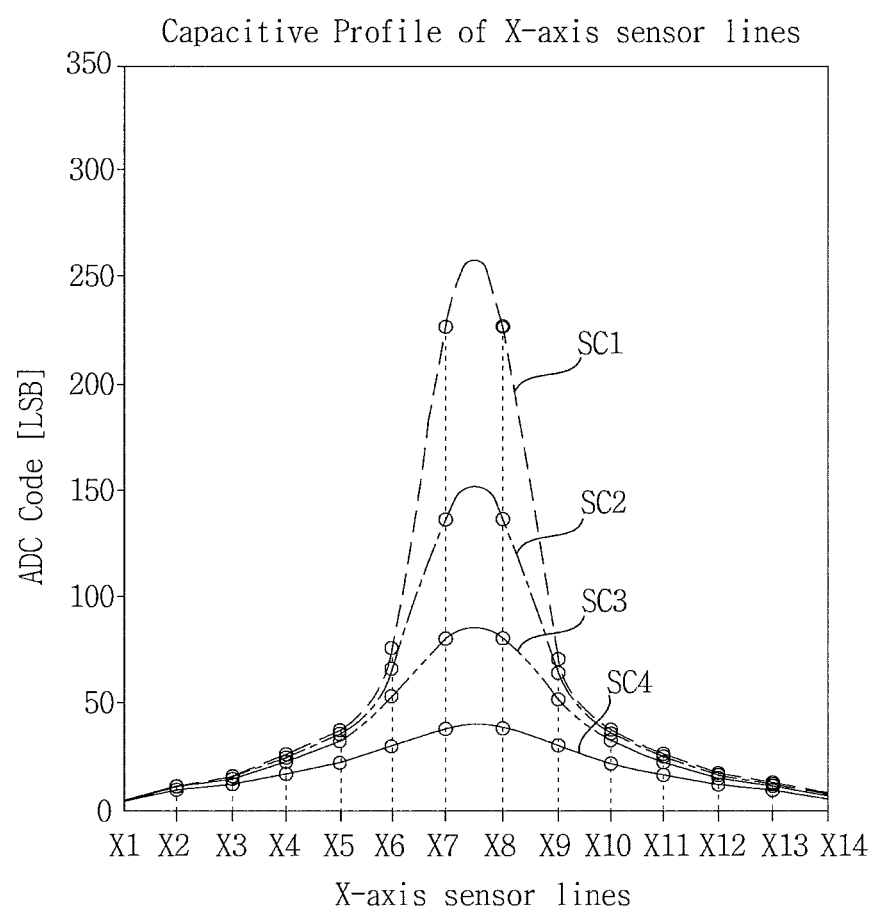

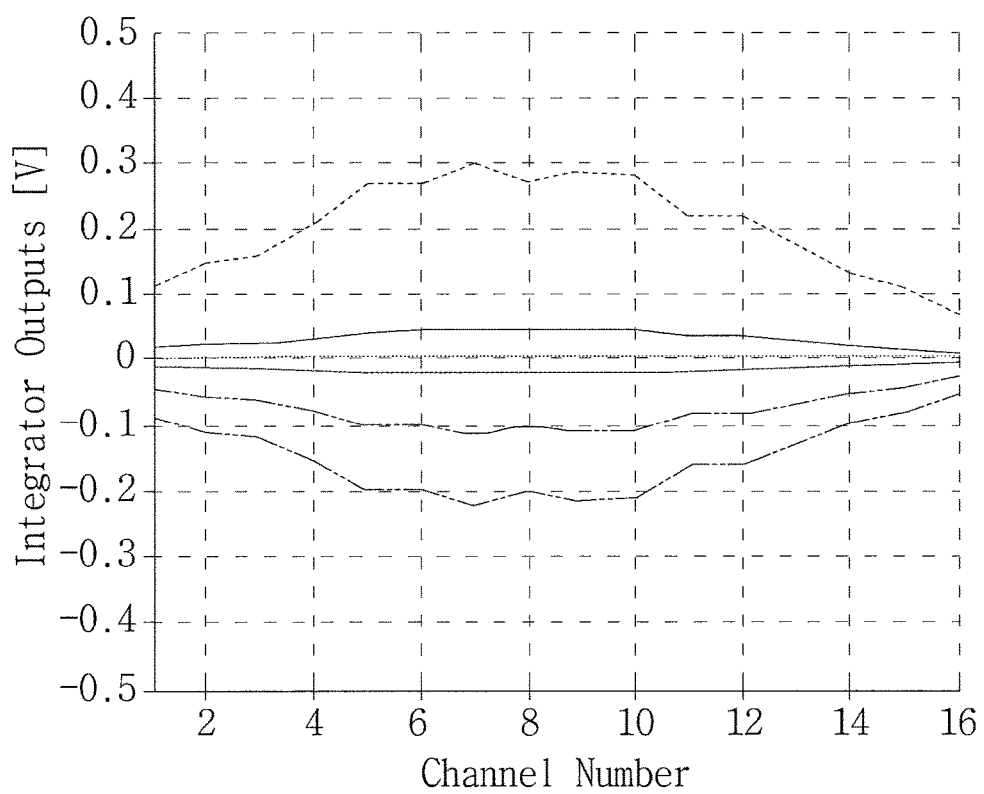

410

420

430

TOUCH ANALOG FRONT END AND TOUCH SENSOR CONTROLLER HAVING THE SAME

CROSS-REFERENCE TO RELATED APPLICATION

This application claims priority under 35 U.S.C. §119 to Korean Patent Application No. 10-2014-00134516 filed on Oct. 6, 2014, the entire contents of which are incorporated herein by reference in their entirety.

FIELD OF INVENTION

The inventive concept relates to a touch analog front-end (AFE), more particularly, to a touch AFE capable of determining whether a capacitive profile has a negative value (i.e., a voltage below a common mode reference voltage) resulting from noise, reversing the polarity of the capacitive profile if it is negative, and accumulating the capacitive profile, and a touch sensor controller having the same.

BACKGROUND

A touch screen for a mobile communication device may be classified into one of two categories: a pressure sensitive type and a capacitive type. The pressure sensitive type is based on a resistor array that senses a signal resulting from a pressure applied to a surface of a screen. And a capacitive type is based on a capacitor array that senses a signal resulting from an amount of discharge from a charged surface of a screen when the surface of the screen is touched. Recently, the capacitive type, which has high-resolution and good sensitivity, has been widely used.

A hover touch recognition function, which extracts information about a position (i.e., a coordinate) from a finger floated over a screen of a mobile device, has been used in connection with devices having capacitive type touch screens. A technique such as the hover touch requires a high level of sensitivity, and the performance of the hover touch may be seriously degraded due to external noise. Examples of such noises include display noise, three-wave length noise, burst noise, and battery charger noise.

SUMMARY

In accordance with aspects of the inventive concept, a touch AFE is provided, which determines whether a sensed capacitive profile is a negative value due to noise, reverses the polarity of the capacitive profile if it is negative, and accumulates the capacitive profile.

In accordance with other aspects of the inventive concept, a touch sensor controller including the touch AFE is provided.

According to an aspect of the inventive concept, there is provided a touch analog front-end (AFE) including a transmitter configured to charge a touch panel and a receiver configured to sense the touch panel, wherein the receiver includes a charge-to-voltage (C2V) converter configured to convert an amount of change of capacitance received from the touch panel into a voltage signal, a filter configured to filter a noise from the voltage signal, resulting in a filtered voltage signal, an integrator configured to accumulate the filtered voltage signal and a polarity detection circuit configured to monitor the filtered voltage signal and to control the integrator to invert the polarity of the filtered voltage signal when it is negative.

In various embodiments, the touch panel may include "m" X-axis line sensors and "n" Y-axis line sensors, the transmitter may include m+n transmitters, each for charging one of the m X-axis line sensors and the n Y-axis line sensors, and the receiver may include m+n receivers, each for sensing one of the m X-axis line sensors and the n Y-axis line sensors.

In various embodiments, each of the m+n transmitters may charge its associated line sensor from the m X-axis line sensors and the n Y-axis line sensors substantially simultaneously with the other m+n transmitters.

In various embodiments, each of the m+n receivers may sense its associated line sensor from the m X-axis line sensors and the n Y-axis line sensors substantially simultaneously with the other m+n receivers.

In various embodiments, the filter may include a sample-and-hold amplifier.

In various embodiments, the integrator may be configured to generate a capacitive profile using the accumulated voltage signal.

In various embodiments, the integrator may be configured to convert the polarity of the filtered voltage signal to positive in response to control of the polarity detection circuit when polarity of the filtered voltage signal is negative and to accumulate the converted voltage signal.

In various embodiments, the filter may include an anti-aliasing filter.

According to another aspect of the inventive concept, there is provided a touch sensor controller (TSC) including a touch analog front-end (AFE) including m+n transmitters, each transmitter configured to charge one of m X-axis line sensors, and n Y-axis line sensors and m+n receivers, each receiver configured to sense one of the m X-axis line sensors and the n Y-axis line sensors. Each of the m+n receivers may include a charge-to-voltage (C2V) converter configured to convert an amount of change of a capacitance received from the touch panel into a voltage signal, a filter configured to filter a noise from the voltage signal, resulting in a filtered voltage signal, an integrator configured to accumulate the filtered voltage signal and a polarity detection circuit configured to monitor the filtered voltage signal and control the integrator to invert a polarity of the filtered voltage signal when the polarity of the filtered voltage signal is negative.

In various embodiments, each of the m+n transmitters may be configured to charge its associated line sensor of the m X-axis line sensors and the n Y-axis line sensors substantially simultaneously with the other m+n transmitters.

In various embodiments, each of the m+n receivers may be configured to sense its associated line sensor of the m X-axis line sensors and the n Y-axis line sensors substantially simultaneously with the other m+n receivers.

In various embodiments, the filter may include a sample-and-hold amplifier.

In various embodiments, the integrator may be configured to convert the polarity of the filtered voltage signal to positive in response to control from the polarity detection circuit when the polarity of the filtered voltage signal is negative and to accumulate the converted voltage signal.

In various embodiments, the integrator may be configured to generate a capacitive profile using the accumulated voltage signal.

In various embodiments, the filter may include an anti-aliasing filter.

According to another aspect of the inventive concept, there is provided a device including a touch panel including a plurality of X-axis line sensors and a plurality of Y-axis line sensors and a touch analog front end (AFE). The AFE includes a plurality of transmitters, each configured to charge one of the plurality of X-axis line sensors and a plurality of Y-axis line sensors; and a plurality of receivers, each configured to sense one of the plurality of X-axis line sensors and a plurality of Y-axis line sensors. Each receiver includes a charge-to-voltage (C2V) converter configured to convert an amount of change of capacitance received from the associated line sensor of the touch panel into a voltage signal, a filter configured to filter a noise from the voltage signal, resulting in a filtered voltage signal; an integrator configured to accumulate the filtered voltage signal, and a polarity detection circuit configured to monitor the filtered voltage signal and to control the integrator to invert a polarity of the filtered voltage signal when it is detected to be negative.

In various embodiments, each of the m+n transmitters may be configured to charge its associated line sensor of the m X-axis line sensors and the n Y-axis line sensors substantially simultaneously with the other m+n transmitters.

In various embodiments, each of the m+n receivers may be configured to sense its associated line sensor of the m X-axis line sensors and the n Y-axis line sensors substantially simultaneously with the other m+n receivers.

In various embodiments, the filter may include a sample-and-hold amplifier.

In various embodiments, the integrator may be configured to convert the polarity of the voltage signal into positive in response to control from the polarity detection circuit when the polarity of the filtered voltage signal is negative and accumulate the converted voltage signal.

BRIEF DESCRIPTION OF THE DRAWINGS

Exemplary embodiments of one or more new and useful process, machine, manufacture, and/or improvement thereof, in accordance with the inventive concept, are provided in the following detailed description taken in conjunction with the accompanying drawings, in which:

FIGS. 3A to 3C are diagrams showing capacitive profiles when various conductors are touched on the touch panel shown in FIG. 2, according to aspects of the inventive concept;

FIG. 5A is a graph illustrating an amount of change of capacitance according to X-axis line sensors shown in FIG. 2, according to aspects of the inventive concept;

FIG. 9B is a graph illustrating a capacitive profile when a polarity detection circuit which is shown in FIG. 6 is not utilized;

DETAILED DESCRIPTION OF THE EMBODIMENTS

Figure 1:
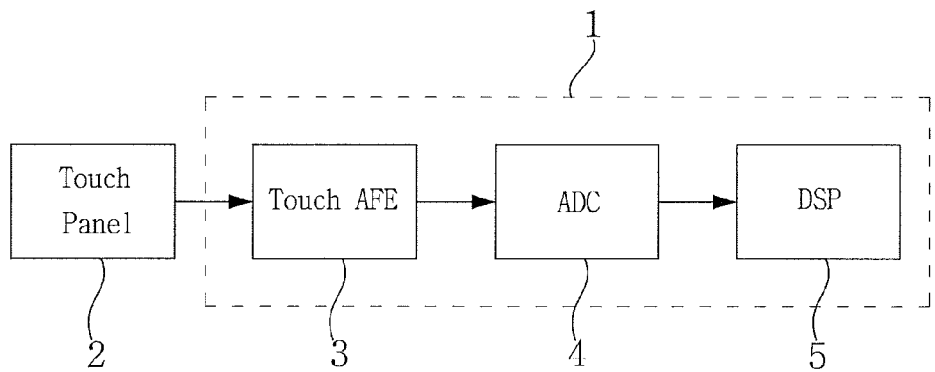
FIG. 1 is a block diagram illustrating an embodiment of a touch sensor controller, according to aspects of the inventive concept.

Aspects of the inventive concept will now be described more fully with reference to the accompanying drawings, in which exemplary embodiments are shown. The inventive concept may, however, be embodied in many different forms and should not be construed as limited to the exemplary embodiments set forth herein. Reference numerals are denoted in detail in the exemplary embodiments of the inventive concept and their examples are indicated in the accompanying drawings. The same reference numerals are used in the description and drawings in order to refer to the same or similar parts wherever possible.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Exemplary embodiments according to aspects of the inventive concept are described below with reference to the accompanying drawings so that a person skilled in the art may easily accomplish the technical spirits of the inventive concept.

FIG. 1 is a block diagram illustrating an embodiment of a touch sensor controller, according to aspects of the inventive concept.

Referring to FIG. 1, an embodiment of a touch sensor controller 1 is shown, which receives a touch signal from a touch panel 2 and generates a digital signal representing the touch signal. The touch sensor controller 1 may include a touch analog front-end (AFE) 3, an analog-to-digital converter (ADC) 4, and a digital signal processor (DSP) 5.

The touch AFE 3 receives the touch signal from the touch panel 2 and processes the received touch signal. The touch AFE 3 transmits the processed touch signal to ADC 4, which converts the processed touch signal into a digital signal. The ADC 4 transmits the digital signal to the DSP 5, which further processes the digital signal. In an embodiment, the DSP 5 may be implemented with an ARM® processor, available from Advanced RISC Machines of San Jose, Calif., as an example.

Various aspects of embodiments of the touch AFE 3 are described with reference to FIGS. 2 and 6.

Figure 2:
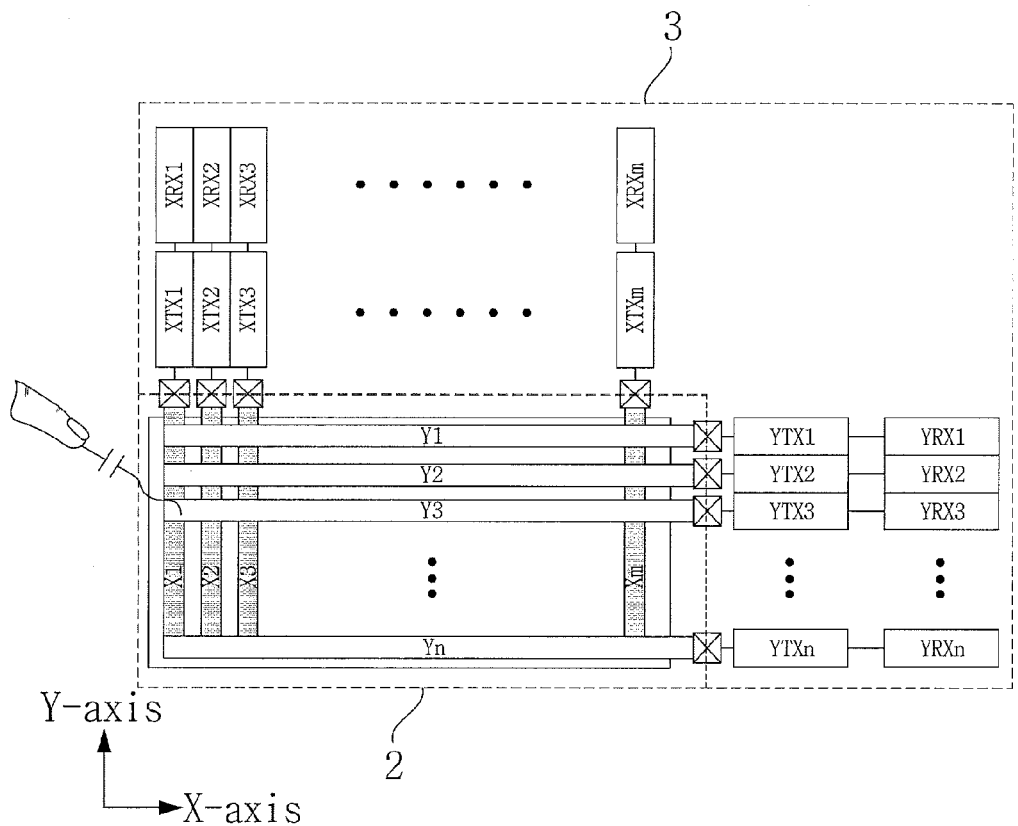
FIG. 2 is a schematic diagram illustrating a touch panel shown in FIG. 1, according to aspects of the inventive concept.

FIG. 2 is a schematic diagram illustrating an embodiment of a touch panel 2 as shown in FIG. 1, according to aspects of the inventive concept.

Referring to FIGS. 1 and 2, the touch panel 2 includes a plurality of X-axis line sensors, X1 through Xm, and includes a plurality of Y-axis line sensors, Y1 through Yn.

The touch AFE 3 substantially simultaneously charges the plurality of X-axis line sensors X1 through Xm and substantially simultaneously senses the plurality of X-axis line sensors X1 through Xm to uniformly maintain an external environment noise. Likewise, the touch AFE 3 substantially simultaneously charges the plurality of Y-axis line sensors Y1 through Yn and substantially simultaneously senses the plurality of Y-axis line sensors Y1 through Yn to uniformly maintain the external environment noise. The external environment noise from the X-axis and Y-axis line sensors can adversely affect operation of the touch panel 2 by a user.

The touch AFE 3 includes a plurality of X-axis transmitters, XTX1 through XTXm, configured to substantially simultaneously charge the X-axis line sensors X1 to Xm, respectively, and a plurality of X-axis receivers XRX1 through XRXm configured to substantially simultaneously sense the X-axis line sensors X1 to Xm, respectively.

Likewise, the touch AFE 3 includes a plurality of Y-axis transmitters YTX1 through YTXn configured to substantially simultaneously charge the Y-axis line sensors Y1 to Yn, respectively, and a plurality of Y-axis receivers YRX1 through YRXn configured to substantially simultaneously sense the Y-axis line sensors Y1 to Yn, respectively.

In one example, the touch panel 2 may include 28 X-axis line sensors X1 to X28 and 16 Y-axis line sensors Y1 to Y16. However, it will be understood that any number of X-axis and Y-axis transmitters/receivers may be used in accordance with embodiments of the touch AFE 3. Each X-axis line sensor and each Y-axis line sensor can be connected to a channel of the ADC 4.

FIGS. 3A to 3C are diagrams showing capacitive profiles resulting from various conductors contacting the touch panel 2 shown in FIG. 2, according to aspects of the inventive concept.

Referring to FIGS. 1 and 3A, a user's finger hovers close to a touch panel 2, without contact. Here, a capacitive touch profile slightly increases in an area where the finger hovers.

Referring to FIGS. 1 and 3B, a user touches the touch panel 2 using a stylus pen. Here, the capacitive touch profile slightly increases in only an area where the stylus pen contacts the touch panel 2.

Referring to FIGS. 1 and 3C, a user's finger contacts the touch panel 2. Here, the capacitive touch profile significantly increases in an area of contact of the finger with the touch panel 2. Accordingly, the larger a cross-sectional area of a conductor (such as a finger or stylus) is, the larger an amount of change of the capacitive touch profile will be.

However, in some instances, external environmental noise may prevent proper capacitive touch profile generation, and the touch profile may not be generated as shown in FIGS. 3A to 3C. Such external environmental noise can be problematic for all types of touch panel user interactions, particularly in the case of the hover touch interaction. Since the magnitude of the capacitive profile sensed by the touch AFE resulting from a hover touch may be much less than a capacitive profile sensed from an actual touch interaction, any external noise may degrade the signal-to-noise ratio, which could result in erroneous readings by the AFE—particularly for a hover touch.

To reduce an effect of external environment noise, all of the plurality of X-axis line sensors are sensed substantially simultaneously and all of the plurality of Y-axis line sensors are sensed substantially simultaneously, according to aspects of the inventive concept.

Figure 4:
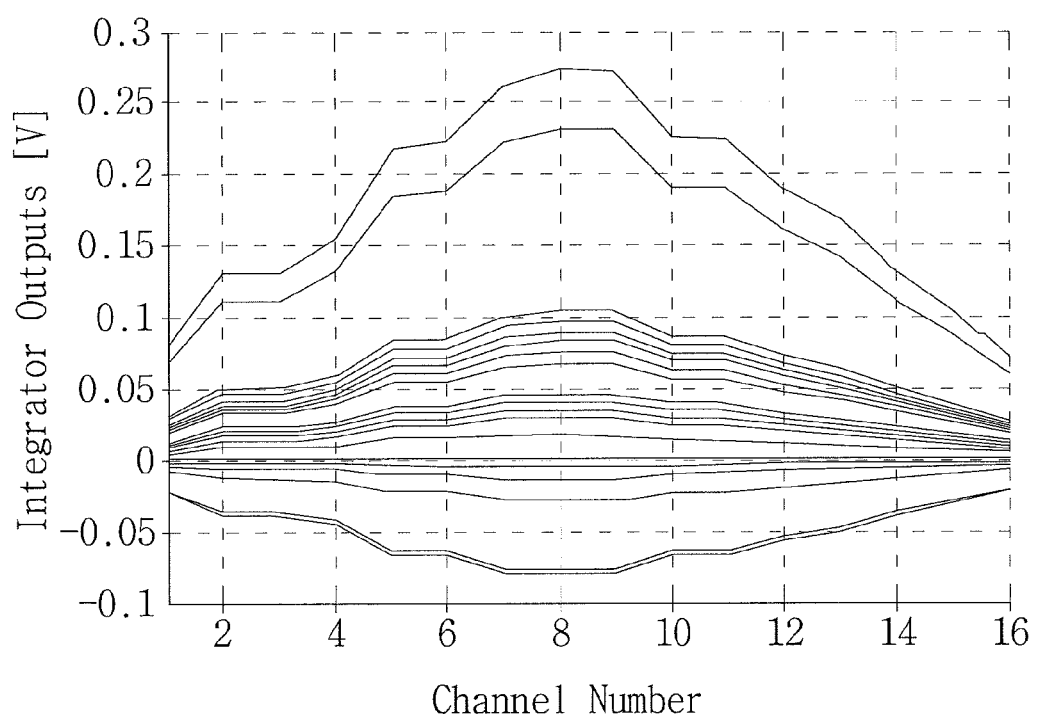
FIG. 4 is a graph illustrating a capacitive profile resulting from noise sensed from the external environment.

FIG. 4 is a graph illustrating a capacitive profile when noise is generated and received from an external environment.

Referring to FIGS. 1 and 4, the abscissa denotes the channel numbers of 16 channels corresponding to 16 line sensors, here 16 Y-axis line sensors from FIG. 1. A similar plot could be made for the X-axis line sensors. Generally, the touch panel can comprise a total number of channels equal to the number of X-axis line sensors plus the number of Y-axis line sensors. For example, a touch panel having 28 X-axis line sensors and 16 Y-axis line sensors would have 44 channels in total, in such embodiments. It will be understood that the number of channels in a touch panel can vary for a number of reasons, including, but not limited to, the size of the panel and the sensitivity of the panel, but this number is not necessarily material to the operation of the touch AFE in accordance with aspects of the inventive concept, since the present invention can be scaled and adapted for different number of X-axis and Y-axis line sensors.

FIG. 4 denotes a capacitive profile for the 16 channels of 16 Y-axis line sensors. The ordinate denotes output voltages of each Y-axis line sensor channel of the touch AFE 3. And the abscissa denotes the channel number of each channel 1 to 16. The output integrator voltages are discrete for each channel 1 to 16, but depicted in FIG. 4 as connected for each integration. That is, each line plot in FIG. 4 represents the output voltages of each channel for one integration operation. The multiple lines represent different integrations for the same 16 channels. The capacitive profile shown may be generated at a hovered position when there is no noise.

Negative values can be caused by the integrators processing environmental noise in the presence of very little to no capacitive effect from a touch or hover. Plotted lines with greater output voltages may indicate the presence of a capacitive effect from a touch or hover, even if in the presence of environmental noise. Therefore, even though the touch AFE 3 senses X-axis line sensors and Y-axis line sensors at the same time, the capacitive profile may have a negative sign due to an external noise. Accordingly, the touch AFE 3 may not sense a coordinate because the capacitive profile has the negative sign.

In other words, the touch AFE 3 may include an integrator for each channel that accumulates the capacitive voltage for each channel, resulting in the capacitive profile. When input of the integrator is a negative voltage, the output of the integrator may be reduced or have a negative number. The touch AFE 3 including the integrator is described below with reference at least to FIG. 6.

For example, when an input signal of the integrator is changed between 0 V and 3 V, a common-mode reference voltage may be set as 1.5 V. Here, when a voltage level of the input signal of the integrator is less than that of the reference voltage, meaning that the magnitude of the input signal is less than a noise threshold represented by the reference voltage, polarity of the input signal of the integrator will be negative. Moreover, when the voltage level of the input signal of the integrator is greater than that of the reference voltage, polarity of the input signal of the integrator will be positive.

FIG. 5A is a graph illustrating an amount of change of capacitance according to the X-axis line sensors X1-Xm shown in FIG. 2, according to aspects of the inventive concept.

Referring to FIGS. 2 and 5A, the abscissa denotes first to fourteenth X-axis line sensors X1 to X14 of twenty eighth X-axis line sensors X1 to Xm (where m=28) and the ordinate denotes the capacitive profile of voltages converted into digital values by the ADC 4, which may be represented as an analog-to-digital conversion (ADC) code. The capacitive profile shown is generated at a hovered position when there is no noise.

The first capacitive profile curve SC1 is representative of when a user performs a hover touch on the touch panel 2 at a height of about 2 mm. The second capacitive profile curve SC2 is representative of when a user performs a hover touch on the touch panel 2 at a height of about 5 mm. The third capacitive profile curve SC3 is representative of when a user performs a hover touch on the touch panel 2 at a height of about 10 mm. The fourth capacitive profile curve SC4 is representative of when a user performs a hover touch on the touch panel 2 at a height of about 20 mm. As shown, the closer the hover touch is to the touch panel 2, the greater the amount of change of the capacitance.

Figure 5B:
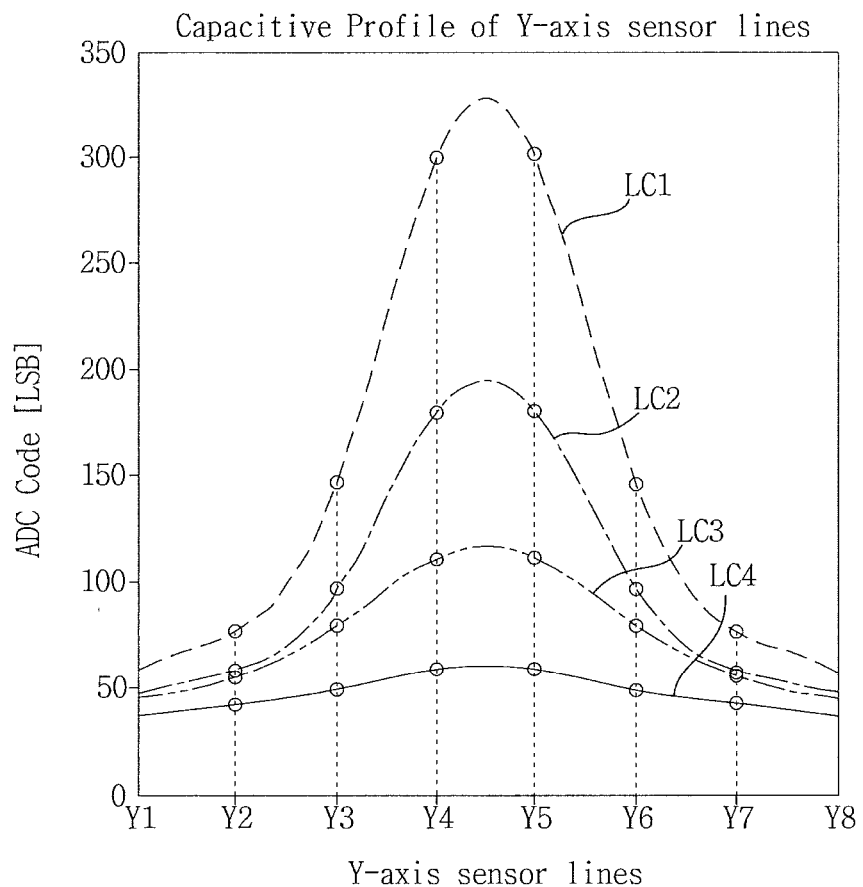
FIG. 5B is a graph illustrating an amount of change of capacitance according to Y-axis line sensors shown in FIG. 2, according to aspects of the inventive concept.

FIG. 5B is a graph illustrating an amount of change of capacitance according to the Y-axis line sensors Y1-Yn shown in FIG. 2, according to aspects of the inventive concept.

Referring to FIGS. 2 and 5B, the abscissa denotes first to eighth Y-axis line sensors Y1 to Y8 of 16 Y-axis line sensors Y1 to Yn (where n=16) and the ordinate denotes an ADC code where the capacitive profile of voltages is converted into a digital value, which also may be represented as the ADC code.

The first capacitive profile curve LC1 is representative of when a user performs a hover touch on the touch panel 2 at a height of about 2 mm. The second capacitive profile curve LC2 is representative of when a user performs a hover touch on the touch panel 2 at a height of about 5 mm. The third capacitive profile curve LC3 is representative of when a user performs a hover touch on the touch panel 2 at a height of about 10 mm. The fourth capacitive profile curve LC4 is representative of when a user performs a hover touch on the touch panel 2 at a height of about 20 mm. As shown, the closer the hover touch is to the touch panel 2, the greater the amount of change of the capacitance.

Figure 6:
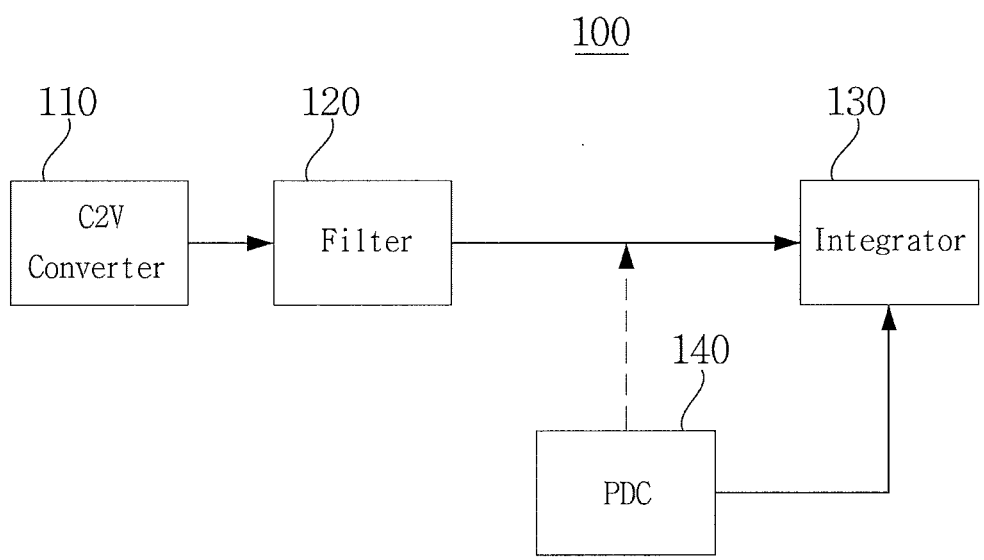
FIG. 6 is a block diagram illustrating an embodiment of a receiver shown in FIG. 2, according to aspects of the inventive concept.

FIG. 6 is a block diagram illustrating an embodiment of one of the receivers shown in FIG. 2, according to aspects of the inventive concept.

Referring to FIGS. 2 and 6, a receiver 100 according to an embodiment of the inventive concept represents one of the X-axis receivers XRX1-XRXm or the Y-axis receivers YRX1-YRXn. That is, each X-axis line sensor and each Y-axis line sensor may include its own receiver 100.

The receiver 100 includes a charge-to-voltage (C2V) converter 110, a filter 120, an integrator 130, and a polarity detection circuit (PDC) 140.

The C2V converter 110 converts information about an amount of change of capacitance received from the touch panel 2 into a voltage signal.

The filter 120 removes noise from the voltage signal, resulting in a filtered voltage signal. In an embodiment, the filter 120 may be implemented with a sample-and-hold amplifier. Further, the filter 120 may include an anti-aliasing filter.

The integrator 130 accumulates the filtered voltage signal, to reduce a bandwidth with respect to the touch signal and to increase sensitivity of the touch signal.

The PDC 140 detects a polarity of the filtered voltage signal by monitoring the filtered voltage signal from the filter 120. When the polarity of the filtered voltage signal from the filter 120 is negative, the PDC 140 controls the integrator 130 to convert the polarity of the signal from a negative polarity to a positive polarity. That is, the PDC 140 performs an adaptive polarity control. When the polarity of the filtered voltage signal is negative, the integrator 130 converts the polarity of the filtered voltage signal to positive in response to control of the PDC 140 and accumulates the converted voltage signal. If the polarity of the voltage signal is not negative, the PDC 140 and integrator 130 do not convert the polarity of the voltage signal and the positive voltage is accumulated.

Figure 7:
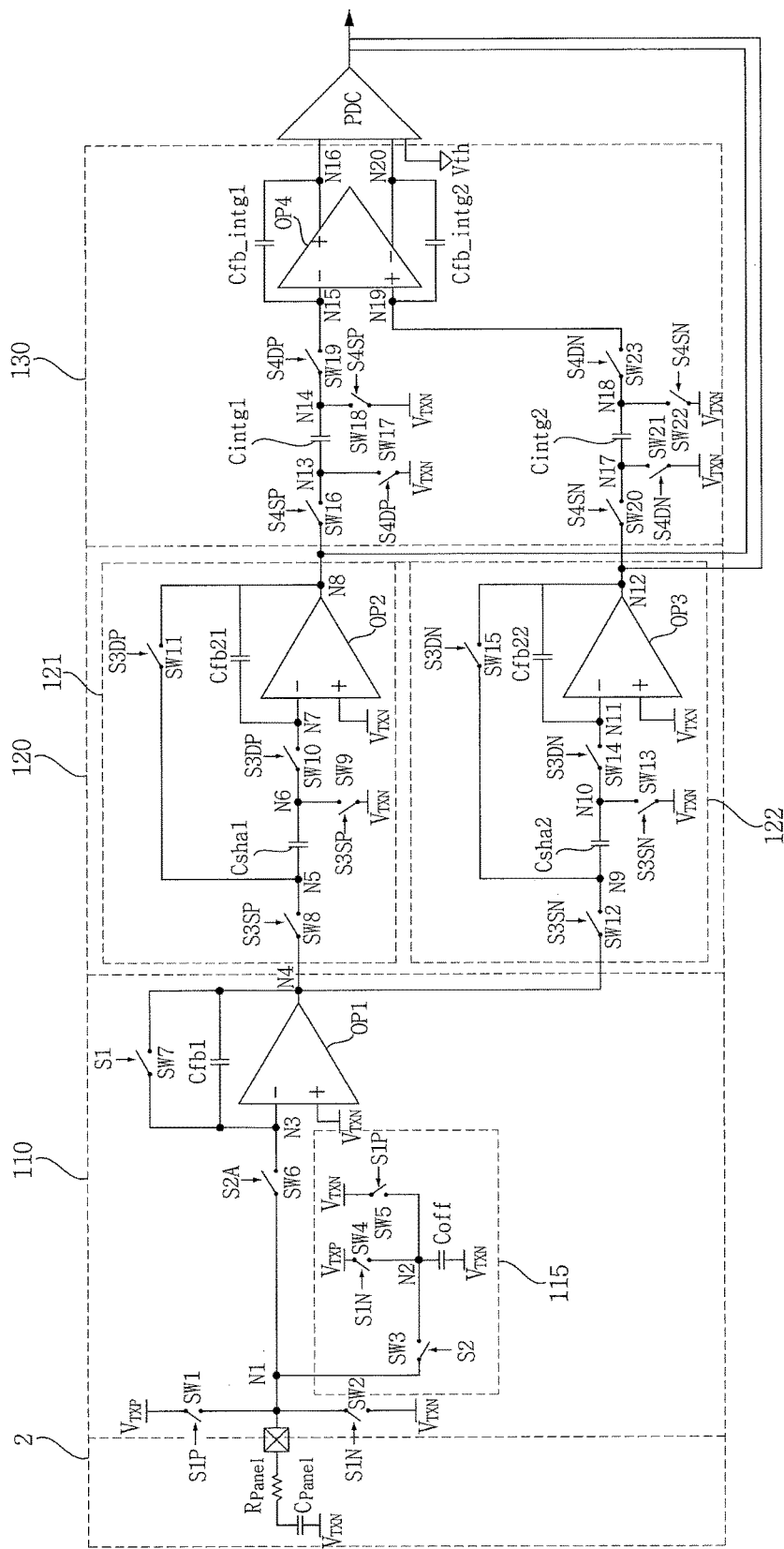
FIG. 7 is a circuit diagram illustrating an embodiment of a C2V converter, a filter, and an integrator shown in FIG. 6, according to aspects of the inventive concept.

FIG. 7 is a circuit diagram illustrating an embodiment of the C2V converter 110, the filter 120, and the integrator 130 shown in FIG. 6, according to aspects of the inventive concept.

Referring to FIGS. 6 and 7, a touch panel 2 may be implemented with a panel capacitor Cpanel and a panel resistor Rpanel.

The C2V converter 110 includes a first switch SW1 operated in response to an S1P signal and a second switch SW2 operated in response to an S1N signal.

The first switch SW1 is connected between a node where a voltage $V_{TXP}$ is applied and a first node N1. The second switch SW2 is connected between the first node N1 and a node where a ground voltage $V_{TXN}$ is applied.

When the S1P signal is activated, the panel capacitor Cpanel is charged with the voltage $V_{TXP}$. When the S1N signal is activated, the panel capacitor Cpanel is charged with the ground voltage $V_{TXN}$. For example, the ground voltage $V_{TXN}$ may be a negative pole of a battery in a mobile device.

The C2V converter 110 includes an offset adjustment unit 115 to remove an offset caused by the panel capacitor Cpanel. The offset adjustment unit 115 includes third to fifth switches SW3 to SW5 and an offset capacitor Coff. In a calibration phase, the offset capacitor Coff may be set to have the same capacitance as the panel capacitor Cpanel. Further, the offset capacitor Coff may be set to have the same capacitance as the panel capacitor Cpanel in a fabrication phase.

The third switch SW3 is connected between the first node N1 and a second node N2 and operated in response to an S2 signal. The fourth switch SW4 is connected between the node where voltage VDT is applied and the second node N2 and operated in response to the S1N signal. The fourth switch SW4 may charge the offset capacitor Coff in response to the S1N signal. The fifth switch SW5 is connected between the node where the ground voltage $V_{TXN}$ is applied and the second node N2 and operated in response to the S1P signal. The fifth switch SW5 discharges the offset capacitor Coff in response to the S1P signal.

The offset adjustment unit 115 sets the offset capacitor Coff to have an amount of charge having an inverse polarity with the panel capacitor Cpanel. That is, the panel capacitor Cpanel and the offset capacitor Coff will have the same amount of charge, but with the opposite polarity of each other.

The C2V converter 110 also includes sixth and seventh switches SW6 and SW7, a C2V feedback capacitance Cfb1, and a first operational amplifier (OP-AMP) OP1. The sixth switch SW6 is connected between the first node N1 and a third node N3 and operated in response to an S2A signal. The seventh switch SW7 is connected between the third node N3 and a fourth node N4 and operated in response to an S1 signal. The C2V feedback capacitance Cfb1 is connected between the third node N3 and the fourth node N4.

The positive input of the first OP-AMP OP1 is connected to the node where the ground voltage $V_{TXN}$ is applied. The negative input of the first OP-AMP OP1 is connected to the third node N3. The output of the first OP-AMP OP1 is connected to the fourth node N4.

Inputs of the filter 120 are also connected to the fourth node N4. The filter 120 divides the voltage signal transmitted from the C2V converter 110 into a positive signal and a negative signal and filters each of the positive signal and the negative signal separately. For such purposes, the filter 120 can include two sample-and-hold amplifiers (SHAs). In this embodiment, the filter 120 includes a first SHA filter 121 for filtering the positive signal and a second SHA filter 122 for filtering the negative signal.

The first SHA filter 121 includes eighth to eleventh switches SW8 to SW11, a first SHA capacitor Csha1, a positive feedback capacitor Cfb21, and a second OP-AMP OP2.

The eighth switch SW8 is connected between the fourth node N4 and a fifth node N5 and operated in response to an S3SP signal. The ninth switch SW9 is connected between a sixth node N6 and a node where the ground voltage $V_{TXN}$ is applied and is also operated in response to the S3SP signal. The tenth switch SW10 is connected between the sixth node N6 and a seventh node N7 and operated in response to an S3DP signal. The eleventh switch SW11 is connected between the fifth node N5 and an eighth node N8 and also operated in response to the S3DP signal.

The first SHA capacitor Csha1 is connected between the fifth node N5 and the sixth node N6. The positive feedback capacitor Cfb21 is connected between the seventh node N7 and the eighth node N8.

The positive input of the second OP-AMP OP2 is connected to a node where the ground voltage $V_{TXN}$ is applied, the negative input of the second OP-AMP OP2 is connected to the seventh node N7 and the output of the second OP-AMP OP2 is connected to the eighth node N8.

The second SHA filter 122 includes twelfth to fifteenth switches SW12 to SW15, a second SHA capacitor Csha2, a negative feedback capacitor Cfb22, and a third OP-AMP OP3.

The twelfth switch SW12 is connected between the fourth node N4 and a ninth node N9 and operated in response to an S3SN signal. The thirteenth switch SW13 is connected between a tenth node N10 and the node where a ground voltage $V_{TXN}$ is applied and also operates in response to the S3SN signal. The fourteenth switch SW14 is connected between the tenth node N10 and an eleventh node N11 and operated in response to an S3DN signal. The fifteenth switch SW15 is connected between the ninth node N9 and a twelfth node N12 and also operated in response to the S3DN signal.

The second SHA capacitor Csha2 is connected between the ninth node N9 and the tenth node N10. The negative feedback capacitor Cfb22 is connected between the eleventh node N11 and the twelfth node N12.

The positive input of the third OP-AMP OP3 is connected to a node where the ground voltage $V_{TXN}$ is applied, the negative input of the third OP-AMP OP3 is connected to the eleventh node N11, and the output of the third OP-AMP OP3 is connected to the twelfth node N12.

The integrator 130 includes sixteenth to twenty-third switches SW16 to SW23, a first integrator capacitor Cintg1, a second integrator capacitor Cintg2, a first integrator feedback capacitor Cfb_intg1, a second integrator feedback capacitor Cfb_intg2, and a fourth OP-AMP OP4.

The sixteenth switch SW16 is connected between the eighth node N8 and a thirteenth node N13 and operated in response to an S4SP signal. The seventeenth switch SW17 is connected between the thirteenth node N13 and a node where the ground voltage $V_{TXN}$ is applied and also operated in response to the S4DP signal. The eighteenth switch SW18 is connected between a fourteenth node N14 and a node where the ground voltage $V_{TXN}$ is applied and operated in response to the S4SP signal. The nineteenth switch SW19 is connected between the fourteenth node N14 and a fifteenth node N15 and also operated in response to the S4DP signal.

The twentieth switch SW20 is connected between the twelfth node N12 and a seventeenth node N17 and operated in response to an S4SN signal. The twenty-first switch SW21 is connected between the seventeenth node N17 and a node where the ground voltage $V_{TXN}$ is applied and also operated in response to the S4DN signal. The twenty-second switch SW22 is connected between an eighteenth node N18 and a node where the ground voltage $V_{TXN}$ is applied and operated in response to the S4SN signal. The twenty-third switch SW23 is connected between the eighteenth node N18 and a nineteenth node N19 and also operated in response to the S4SN signal.

The first integrator capacitor Cintg1 is connected between the thirteenth node N13 and the fourteenth node N14. The second integrator capacitor Cintg2 is connected between the seventeenth node N17 and the eighteenth node N18.

The first integrator feedback capacitor Cfb_intg1 is connected between the fifteenth node N15 and a sixteenth node N16. The second integrator feedback capacitor Cfb_intg2 is connected between the nineteenth node N19 and a twentieth node N20.

The positive input of the fourth OP-AMP OP4 is connected to the nineteenth node N19. And the negative input of the fourth OP-AMP OP4 is connected to the fifteenth node N15. The positive output of the fourth OP-AMP OP4 is connected to the sixteenth node N16 and the negative output of the fourth OP-AMP OP4 is connected to the twentieth node N20.

The PDC 140 may take the form of a comparator having its positive terminal connected to node N16 and its negative terminal connected to node N20. Thus, when the voltage at N20 is greater than the voltage at N16, the integrator polarity is changed by connecting node N8 to switch SW20 and node N12 to switch SW16.

An operation of each of the C2V converter 110, the filter 120, and the integrator 130 is described below with reference to FIG. 8.

Figure 8:
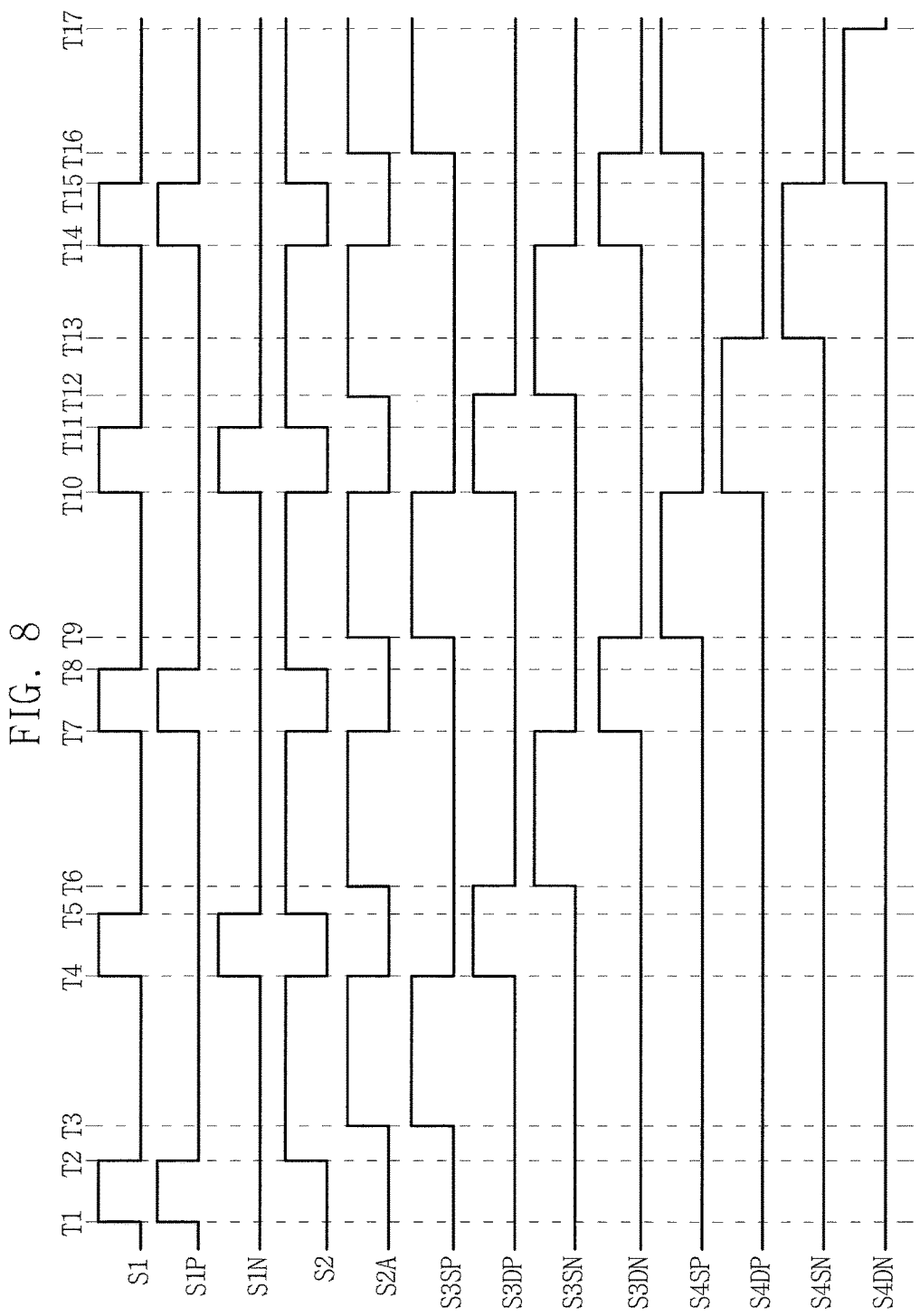
FIG. 8 is a timing diagram illustrating an embodiment of an operation of a touch AFE shown in FIG. 7, according to aspects of the inventive concept.

FIG. 8 is a timing diagram illustrating an embodiment of an operation of the touch AFE shown in FIG. 7, according to aspects of the inventive concept. In the below discussion, for purposes of describing the embodiments, when a signal is discussed as being "activated," the signal has a high state or logic "1," but the invention is not limited by this characterization. In one embodiment of the inventive concept, the clock signals described below with reference to FIG. 8 are generated with a dedicated clock generator (not shown).

Referring to FIGS. 7 and 8, from time T1 to time T2, when the S1 signal is activated, the seventh switch SW7 is in an on state. Whenever the seventh switch SW7 is in an on state, the first OP-AMP OP1 is reset. That is, the third node N3, which is the negative input of the first OP-AMP OP1, and the fourth node N4, which is output of the first OP-AMP OP1, have no potential difference.

From time T1 to time T2, when the SIT signal is activated, the first switch SW1 and the fifth switch SW5 are in on states. Whenever the first switch SW1 is in an on state, the panel capacitor Cpanel is charged by the voltage $V_{TXP}$.

From time T2 to time T4, when the S2 signal is activated, the third switch SW3 is in an on state. The offset adjustment unit 115 sets the offset capacitor Coff to have the same amount of charge as the panel capacitor Cpanel, but has an inverse (or opposite) sign with respect to the panel capacitor Cpanel. Accordingly, when the second switch SW2 is in an on state, the charge of the panel capacitor Cpanel and the charge of the offset capacitor Coff cancel each other.

From time T3 to time T4, when the S2A signal and the S3SP signal are activated, the sixth switch SW6, the eighth switch SW8, and the ninth switch SW9 are in on states. Here, charge with respect to an amount of change of capacitance by a proximity operation or a touch operation is stored in the C2V feedback capacitor Cfb1. Moreover, charge stored in the C2V feedback capacitor Cfb1 charges the first SHA capacitor Csha1.

From time T4 to time T5, when the S1 signal is activated, the seventh switch SW7 is in an on state. Whenever the seventh switch SW7 is in an on state, the first OP-AMP OP1 is reset.

From time T4 to time T5, when the S1N signal is activated, the second switch SW2 and the fourth switch SW4 are in on states. Whenever the second switch SW2 is in an on state, the panel capacitor Cpanel is discharged. Whenever the fourth switch SW4 is in an on state, the offset capacitor Coff is charged by the voltage $V_{TXP}$.

From time T4 to time T6, when the S3DP signal is activated, the tenth switch SW10 and the eleventh switch SW11 are in on states. Here, charge stored in the first SHA capacitor Csha1 charges the positive feedback capacitor Cfb21.

From time T6 to time T7, when the S2A signal and the S3SN signal are activated, the sixth switch SW6, the twelfth switch SW12, and the thirteenth switch SW13 are in on states. Here, charge with respect to an amount of change of capacitance by a proximity operation or a touch operation is stored in the C2V feedback capacitor Cfb1. Moreover, charge stored in the C2V feedback capacitor Cfb1 charges the second SHA capacitor Csha2.

From time T7 to time T9, when the S3DN signal is activated, the fourteenth switch SW14 and the fifteenth switch SW15 are in on states. Here, charge stored in the second SHA capacitor Csha2 charges the negative feedback capacitor Cfb22.

From time T9 to time T10, when the S4SP signal is activated, the sixteenth switch SW16 and the eighteenth switch SW18 are in on states. Here, charge stored in the positive feedback capacitor Cfb21 charges the first integrator capacitor Cintg1.

From time T10 to time T13, when the S4DP signal is activated, the seventeenth switch SW17 and the nineteenth switch SW19 are in on states. Here, charge stored in the first integrator capacitor Cintg1 charges the first integrator feedback capacitor Cfb_intg1.

From time T13 to time T15, when the S4SN signal is activated, the twentieth switch SW20 and the twenty-second switch SW22 are in on states. Here, charge stored in the negative feedback capacitor Cfb22 charges the second integrator capacitor Cintg2.

From time T15 to time T17, when the S4DN signal is activated, the twenty-first switch SW21 and the twenty-third switch SW23 are in on states. Here, charge stored in the second integrator capacitor Cintg2 charges the second integrator feedback capacitor Cfb_intg2.

Figure 9A:
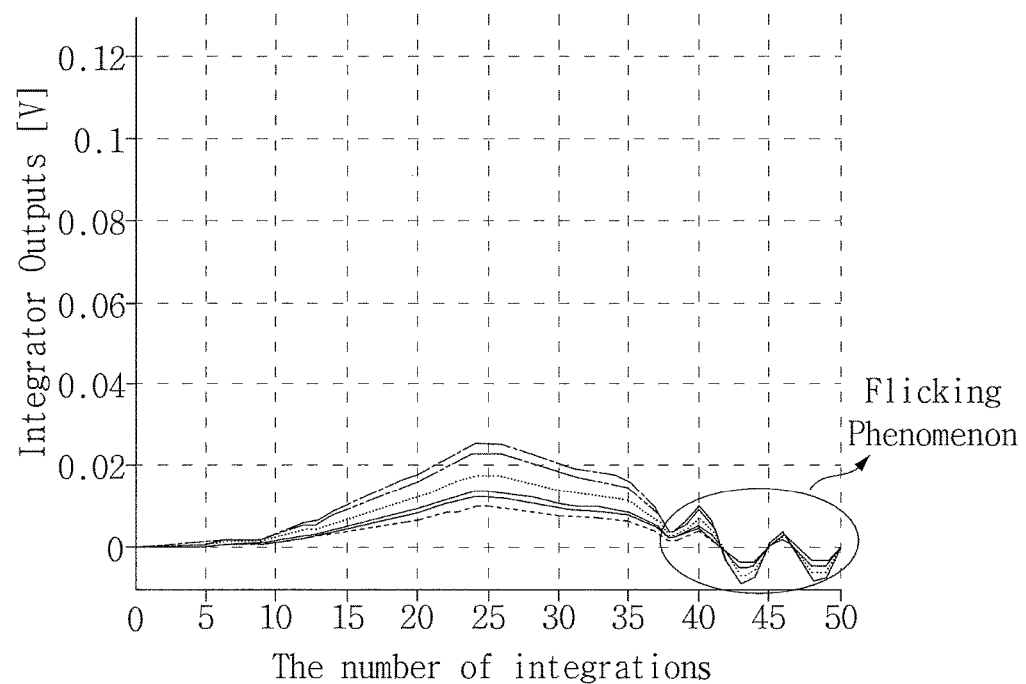
FIG. 9A is a graph illustrating output of an integrator when a polarity detection circuit shown in FIG. 6 is not utilized.

FIG. 9A is a graph illustrating an example of the output of an integrator when a PDC shown in FIG. 6 is not utilized.

Referring to FIGS. 6 and 9A, the abscissa in FIG. 9A denotes a number of integrations for an X-axis line sensor or a Y-axis line sensor. And the ordinate denotes the output voltages of a single integrator of a single channel.

To sense a proximity operation or a touch operation, the touch AFE 100 simultaneously charges the plurality of X-axis line sensors and the plurality of Y-axis line sensors and simultaneously senses the plurality of X-axis line sensors and the plurality of Y-axis line sensors, during a frame, as described above. When the touch AFE 100 charges and senses the plurality of X-axis line sensors and the plurality of Y-axis line sensors once, a curve depicting the voltage accumulated at the integrator 130 results.

Noise from an external environment may cause an output voltage of the integrator 130 to decrease rather than increase over time. This may occur because a voltage signal where a touch input is converted may have a negative sign due to the noise. Accordingly, a flicking phenomenon (i.e., losing a coordinate) shown in FIG. 9A can occur. That is, the flickering phenomenon causes an unstable and uncertain result with respect to properly sensing an input from the touch panel 2.

FIG. 9B is a graph illustrating an example of a capacitive profile when a PDC, which is shown in FIG. 6, is not operated.

Referring to FIGS. 6 and 9B, the abscissa denotes a channel number for each of the 16 Y-axis line sensors, as an example, and the ordinate denotes a capacitive profile in terms of integrator output voltage for each of the 16 channels. As discussed above with respect to FIG. 4, each integrator output voltage is discrete, but the integrator output voltages are shown connected by a line to represent a specific integration cycle. Thus, each line represents a different integration cycle for the 16 channels.

The capacitive profile is a plot depicting an amount of change of capacitance voltages with respect to a touch input, which is converted into a digital code. The capacitive profile may have a negative value due to an influence of sensed external noise, as discussed above.

Figure 10A:
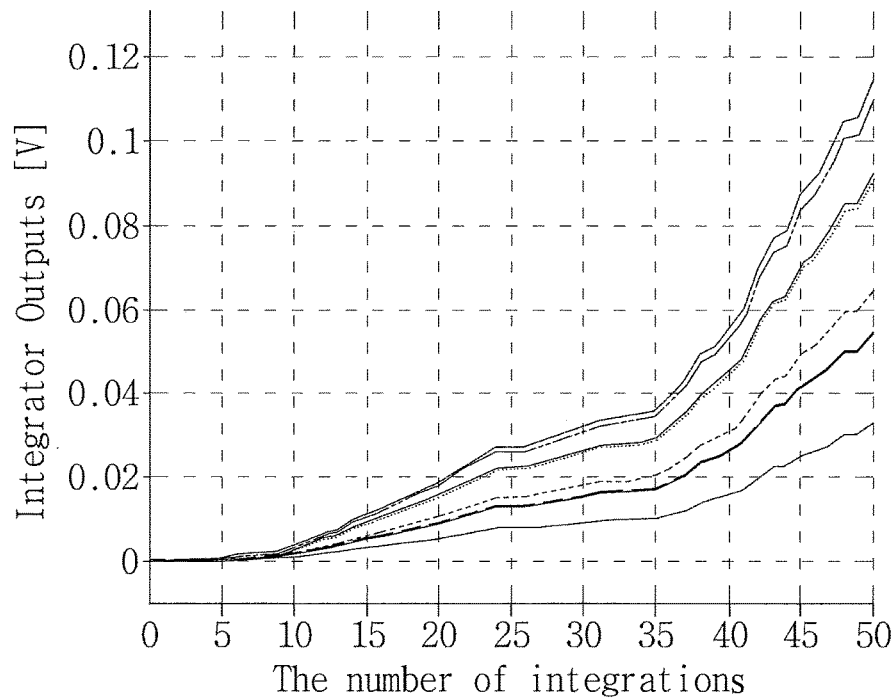
FIG. 10A is a graph illustrating an output of an integrator when a polarity detection circuit shown in FIG. 6 detects a polarity of a capacitive profile, according to aspects of the inventive concept.

FIG. 10A is a graph illustrating output of an integrator 130 when PDC 140 shown in FIG. 6 is utilized to detect the polarity of a capacitive profile and to control the output of the integrator based on the detection of polarity, according to aspects of the inventive concept.

Referring to FIGS. 6, 7 and 10A, similar to FIG. 9A, the abscissa in FIG. 10A denotes a number of integrations for an X-axis line sensor or a Y-axis line sensor. And the ordinate denotes output voltages of a single integrator.

To sense a proximity operation or a touch operation, the touch AFE 100 simultaneously charges the plurality of X-axis line sensors and the plurality of Y-axis line sensors and simultaneously senses the plurality of X-axis line sensors and the plurality of Y-axis line sensors during a frame, or clock cycle. When the touch AFE 100 charges and senses the plurality of X-axis line sensors and the plurality of Y-axis line sensors once, a curve depicting the voltage accumulated at the integrator 130 can be generated.

As described above, the filter 120 divides the voltage signal transmitted from the C2V converter 110 into a positive signal and a negative signal and filters each of the positive signal and the negative signal separately. According to aspects of the inventive concept, the PDC 140 monitors the signals output from the filter 120 at nodes N8 and N12, see FIG. 7, and determines a polarity of the signal. PDC 140 includes a comparator that receives the voltages at nodes N16 and N20 as inputs. The comparator compares the differential voltage output at nodes N16 and N20. If the differential voltage is positive, through feedback form the PDC 140, node N8 is coupled to switch SW16 and node N12 is coupled to switch SW20. This maintains the polarity of the voltage input to integrator 130 as positive, resulting in a positive accumulation of voltage by the integrator 130, such as is shown in FIG. 10A. However, if the differential voltage between nodes N16 and node N20 is negative, node N8 is coupled to switch SW20 and node N12 is coupled to switch SW16, through feedback form the PDC 140. This causes the polarity of the input voltage to the integrator 130 to be inverted from negative to positive, which results in a positive accumulation of voltage by the integrator 130.

When the polarity of the signal output from the filter 120 is negative, the PDC 140 controls the integrator 130 to invert the polarity of the capacitive profile. Accordingly, the output of the integrator 130 will continuously increase, as shown in FIG. 10A. Moreover, effects of a flicking phenomenon will be eliminated or at least minimized. In contrast to the profiles shown in FIG. 9A, where the PDC 140 is not utilized to invert a negative polarity of a capacitive profile, which results in a decrease of the output voltage of the integrator 130, when the PDC is utilized to invert a negative polarity of the capacitive profile, the output voltage of the integrator 130 will continue to increase, as shown in FIG. 10A, over a number of integrations or accumulations of voltage by the integrator 130. This results in a more definitive indication of a sensing of a touch (hover or actual) on the touch panel, since any effect of external environmental noise is essentially minimized or eliminated.

Figure 10B:
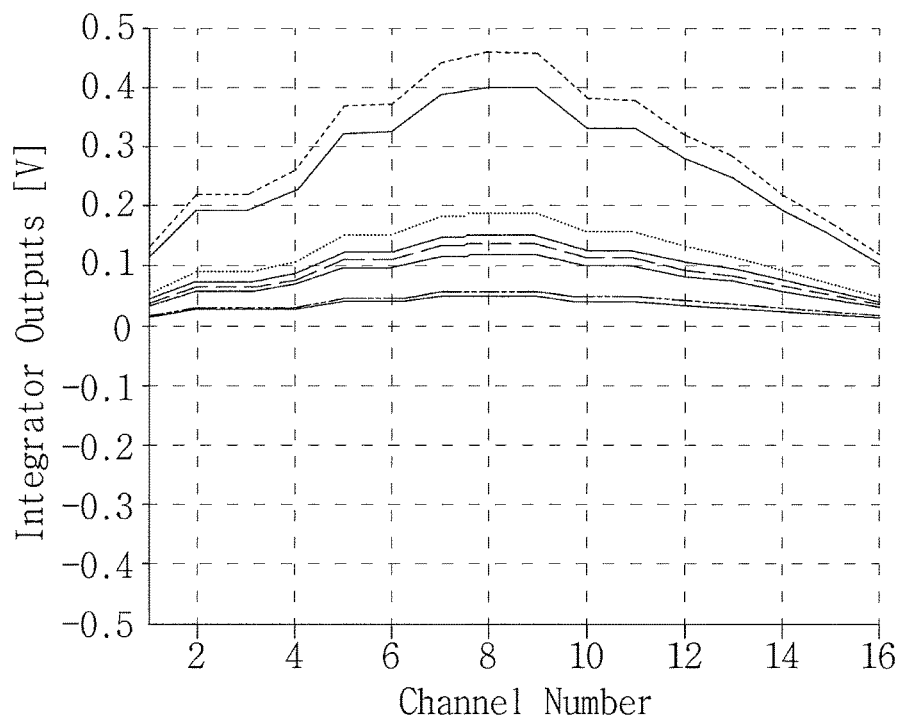
FIG. 10B is a graph illustrating a capacitive profile when a polarity detection circuit shown in FIG. 6 detects a polarity of the capacitive profile, according to aspects of the inventive concept.

FIG. 10B is a graph illustrating a capacitive profile when the PDC 140 shown in FIG. 6 is utilized to detect a polarity of the capacitive profile and to control the output of the integrator based on the detection of polarity, according to aspects of the inventive concept.

Referring to FIGS. 6 and 10B, the abscissa denotes a channel number of the 16 Y-axis line sensors, as an example, and the ordinate denotes a capacitive profile in terms of integrator output voltages of the integrators of the 16 channels, similar to FIG. 9B. Each plotted line denotes a different integration cycle for the 16 channels.

When the capacitive profile detected by the PDC 140 is negative, as in FIG. 9B, the PDC 140 controls the integrator 130 to invert the polarity of the capacitive profile. Comparing the graphs of FIG. 9B, in which the PDC is not utilized to detect a polarity of the capacitive profile and to control the output of the integrator based on the detection of polarity and FIG. 10B, in which the PDC is utilized to detect a polarity of the capacitive profile and to control the output of the integrator based on the detection of polarity, it can be seen that use of the PDC in accordance with aspects of the inventive concept essentially minimizes or eliminates the effects of external environmental noise on the sensing operation of the touch panel.

Figure 11:
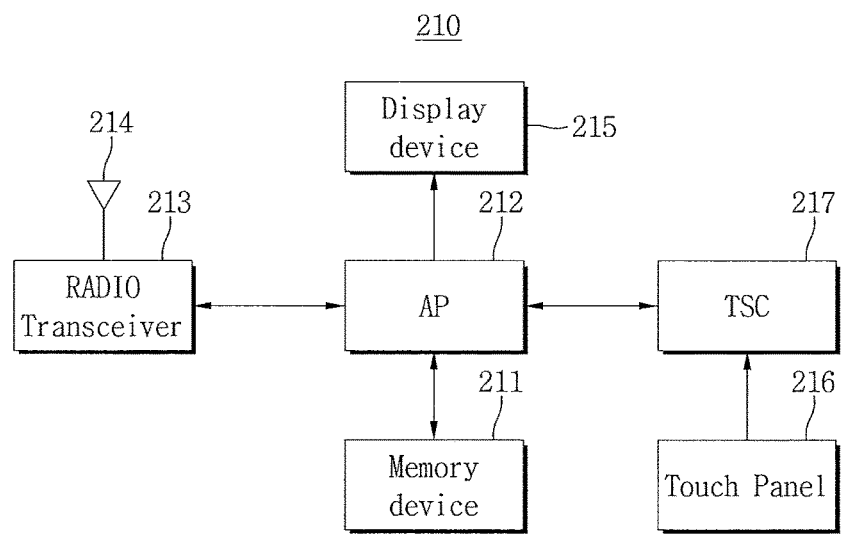
FIG. 11 is a block diagram illustrating an embodiment of a computer system including the touch sensor controller (TSC) shown in FIG. 1, according to aspects of the inventive concept.

FIG. 11 is a block diagram illustrating an embodiment of a computer system 210 including the touch sensor controller (TSC) shown in FIG. 1, in accordance with aspects of the inventive concept.

Referring to FIG. 11, the computer system 210 includes a memory device 211, an application processor (AP) 212, including a memory controller for controlling the memory device 211, a radio transceiver 213, an antenna 214, a display device 215, a touch panel 216, and a TSC 217.

The radio transceiver 213 transmits and receives radio signals through the antenna 214. For example, the radio transceiver 213 converts radio signals received through the antenna 214 into a signal that can be processed in the AP 212.

Accordingly, the AP 212 processes signals output from the radio transceiver 213 and transmits the processed signals to the display device 215. Further, the radio transceiver 213 converts signals output from the AP 212 into radio signals and transmits the converted radio signal to an external device through the antenna 214.

The touch panel 216 receives touch signals from a user and converts the touch signals into signals representing the amount of change of capacitance sensed by the touch panel 216. The touch panel 216 transmits information about the amount of change of capacitance to the TSC 217. The TSC 217 converts the information about the amount of change of capacitance into coordinate information and transmits the coordinate information to the AP 212. In one embodiment, the TSC 217 may include the TSC 1 shown in FIG. 1.

Figure 12:
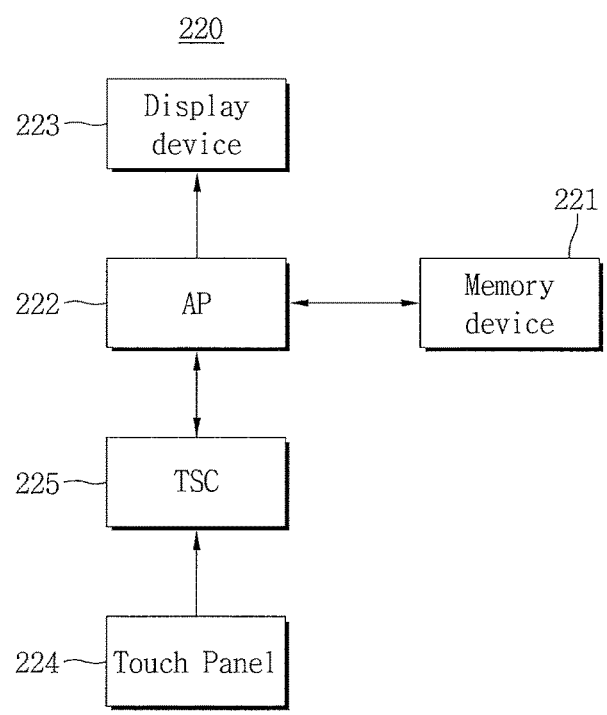
FIG. 12 is a block diagram illustrating an embodiment of a computer system including the TSC shown in FIG. 1, according to aspects of the inventive concept.

FIG. 12 is a block diagram illustrating another embodiment of a computer system 220 including the TSC shown in FIG. 1 in accordance with aspects of the inventive concept.

Referring to FIG. 12, the computer system 220 may be a personal computer (PC), a network server, a tablet PC, a netbook, an e-reader, a personal digital assistant (PDA), a portable multimedia player (PMP), an MP3 player, an MP4 player, or any other device utilizing a touch panel.

The computer system 220 includes a memory device 221, an AP 222, including a memory controller for controlling a data processing operation of the memory device 221, a display device 223, a touch panel 224, and a TSC 225.

The touch panel 224 receives touch signals from a user and converts the touch signals into signals representing the amount of change of capacitance sensed by the touch panel 224. The touch panel 224 transmits information about the amount of change of capacitance to the TSC 225. The TSC 225 converts the information about the amount of change of capacitance into coordinate information and transmits the coordinate information to the AP 222.

The AP 222 displays data stored in the memory device 221 through the display device 223 according to data inputted through the touch panel 224.

In one embodiment, the TSC 225 may include the TSC 1 shown in FIG. 1.

Figure 13:
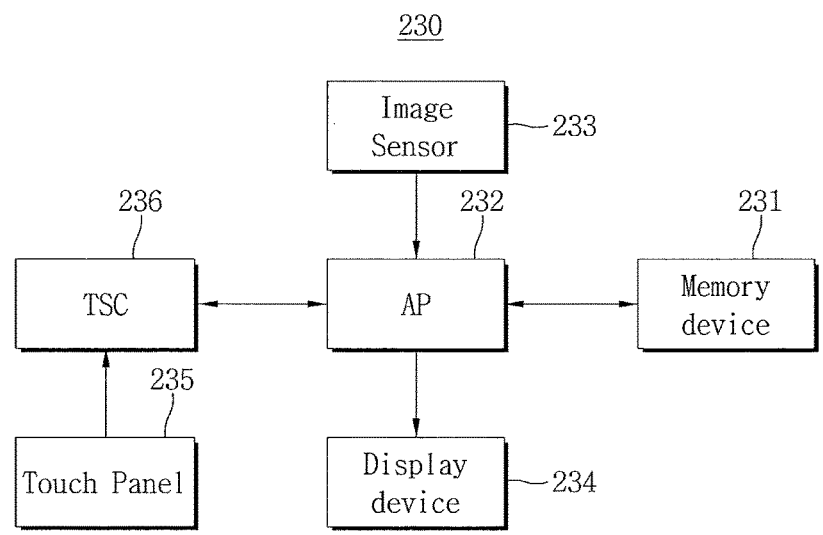
FIG. 13 is a block diagram illustrating an embodiment of a computer system including the TSC shown in FIG. 1, according to aspects of the inventive concept.

FIG. 13 is a block diagram illustrating still another embodiment of a computer system 230 including the TSC shown in FIG. 1, in accordance with aspects of the inventive concept.

Referring to FIG. 13, the computer system 230 may be an image processing device, for example, a digital camera, or a mobile phone, a smart phone, or a tablet PC in which a digital camera is installed.

The computer system 230 includes a memory device 231, an AP 232, including a memory controller for controlling a data processing operation, for example, a write operation or a read operation, of the memory device 231, an image sensor 233, a display device 234, a touch panel 235, and a TSC 236.

The image sensor 233 converts an optical image into digital signals, and the converted digital signals are transmitted to the AP 232. According to control of the AP 232, the converted digital signals are displayed through the display device 234, or stored in the memory device 231. Further, the data stored in the memory device 231 is displayed through the display device 234 according to the control of the AP 232.

The touch panel 235 receives touch signals resulting from touches thereon by a user. The touch panel 235 converts the touch signals into signals representing the amount of change of capacitance sensed by the touch panel 235. The touch panel 235 transmits information about the amount of change of capacitance to the TSC 236. The TSC 236 converts the information about the amount of change of capacitance into coordinate information and transmits the coordinate information to the AP 232.

In one embodiment, the TSC 236 may include the TSC 1 shown in FIG. 1.

Figure 14:
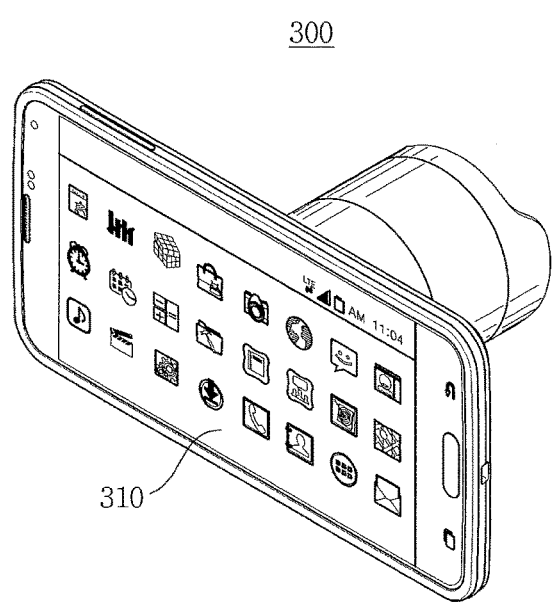
FIG. 14 illustrates an embodiment of a digital camera device including a TSC shown in FIG. 1, according to aspects of the inventive concept.

FIG. 14 illustrates an embodiment of a digital camera device 300 including the TSC shown in FIG. 1, according to aspects of the inventive concept.

Referring to FIG. 14, the digital camera device 300 may operate, for example, with an Android® OS, available from Google, Inc. of Mountain View, Calif. In the embodiment, the digital camera device 300 may include, as examples, a Galaxy Camera™ or Galaxy Camera2™, available from the assignee of the present application.

The digital camera device 300 includes a touch panel 310 to receive a touch input from a user, a TSC (not shown, but internal) to control the touch panel 310, an image sensor (not shown, but internal) to capture an image or a moving image and an AP (not shown) to control the image sensor.

In the embodiment, the digital camera device 300 includes the TSC 1 shown in FIG. 1.

Figure 15A:
FIGS. 15A to 15C illustrate embodiment of wearable devices including the TSC shown in FIG. 1, according to aspects of the inventive concept.
Figure 15B:
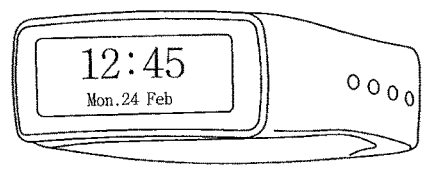
Figure 15C:
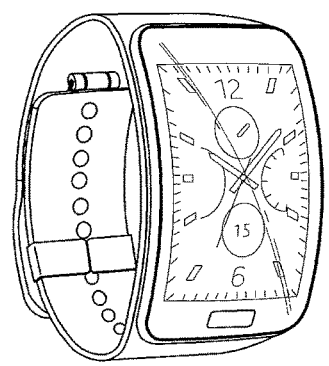

FIGS. 15A to 15C illustrate embodiments of wearable devices including the TSC shown in FIG. 1, in accordance with aspects of the inventive concept.

Referring to FIGS. 15A and 15C, each of first to third wearable devices 410 to 430 is a type of a wrist watch. Each of the first to third wearable devices 410 to 430 may operate, as examples, with an Android® OS or TIZEN® OS, available from the Linux Foundation.

In the embodiment, the first wearable device 410 may comprise a Galaxy Gear2™, the second wearable device 420 may comprise a Galaxy Gear Fit™, and the third wearable device 430 may comprise a Galaxy Gear S™, all available from the assignee of the present application.

Each of the first to third wearable devices 410 to 430 may include an AP (not shown), which operates with an Android™ OS or TIZEN™ OS, an image sensor (not shown) which captures an image or a moving image and a display device which displays the photographed image or a moving image.

In the embodiment, each of the first to third wearable devices 410 to 430 may include the TSC 1 shown in FIG. 1.

Figure 16:
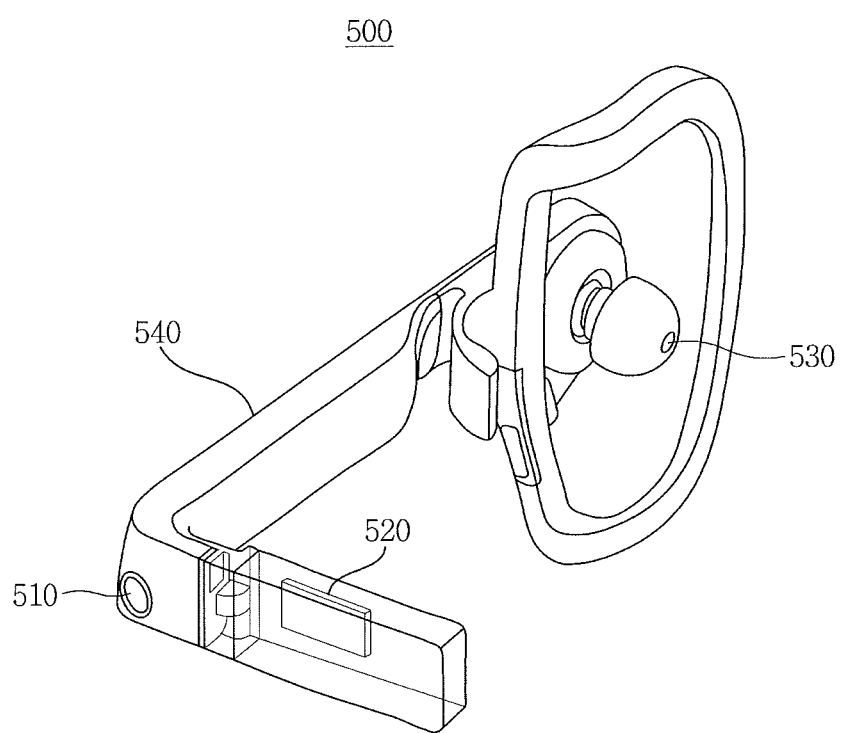
FIG. 16 illustrates an embodiment of a wearable device including the TSC shown in FIG. 1, according to aspects of the inventive concept.

FIG. 16 illustrates an embodiment of a wearable device including the TSC shown in FIG. 1.

Referring to FIG. 16, a fourth wearable device 500 is shown, which may be worn on an ear and provide sound and image information to a user. The fourth wearable device 500 may operate, as examples, with an Android® OS or TIZEN® OS. In the embodiment, the fourth wearable devices 500 may comprise a Galaxy Gear Blink™, for example.

The fourth wearable devices 500 includes an image sensor 510 which captures still and video images, a display device 520 which displays the photographed image, an earphone 530, a touch panel 540 for receiving touch input, and a touch sensor controller (not shown) for converting the touch input into a touch coordinate.

In the embodiment, the fourth wearable device 500 may include the TSC 1 shown in FIG. 1.

While embodiments in accordance with the inventive concept have been particularly shown and described with reference to exemplary drawings thereof, it will be understood that various changes in form and details may be made therein without departing from the spirit and scope of the following claims, which cover that shown and described with respect to the figures, as well as physical and/or functional equivalents thereof.

What is claimed is:

1. A touch analog front-end (AFE) comprising:
   a transmitter configured to charge a touch panel; and
   a receiver configured to sense a hover touch over the touch panel, wherein the receiver comprises:
a charge-to-voltage (C2V) converter configured to convert an amount of change of capacitance received from the touch panel into a voltage signal;
a filter configured to filter a noise from the voltage signal, resulting in a filtered voltage signal;
an integrator configured to accumulate the filtered voltage signal; and
a polarity detection circuit configured to monitor the filtered voltage signal and to control the integrator to invert a polarity of the filtered voltage signal when the polarity of the filtered voltage signal is negative.

2. The touch AFE of claim 1, wherein the touch panel includes m X-axis line sensors and n Y-axis line sensors,
the transmitter includes m+n transmitters, each configured to charge one of the m X-axis line sensors and the n Y-axis line sensors, and
the receiver includes m+n receivers, each configured to sense one of the m X-axis line sensors and the n Y-axis line sensors.

3. The touch AFE of claim 2, wherein each of the m+n transmitters is configured to charge its associated line sensor from the m X-axis line sensors and the n Y-axis line sensors substantially simultaneously with the other m+n transmitters.

4. The touch AFE of claim 2, wherein each of the m+n receivers is configured to sense its associated line sensor from the m X-axis line sensors and the n Y-axis line sensors substantially simultaneously with the other m+n receivers.

5. The touch AFE of claim 1, wherein the filter includes a sample-and-hold amplifier.

6. The touch AFE of claim 1, wherein the integrator is configured to generate a capacitive profile using the accumulated voltage signal.

7. The touch AFE of claim 1, wherein the integrator is further configured to:
convert the polarity of the filtered voltage signal to positive in response to control of the polarity detection circuit when polarity of the filtered voltage signal is negative; and
accumulate the converted voltage signal.

8. The touch AFE of claim 1, wherein the filter includes an anti-aliasing filter.

9. A touch sensor controller (TSC), comprising:
a touch analog front-end (AFE) including:
m+n transmitters, each transmitter configured to charge one of m X-axis line sensors and n Y-axis line sensors, and
m+n receivers, each receiver configured to sense one of the m X-axis line sensors and the n Y-axis line sensors, wherein each of the m+n receivers comprises:
a charge-to-voltage (C2V) converter configured to convert an amount of change of a capacitance received from the touch panel into a voltage signal;
a filter configured to filter a noise from the voltage signal, resulting in a filtered voltage signal;
an integrator configured to accumulate the filtered voltage signal; and
a polarity detection circuit configured to monitor the filtered voltage signal and control the integrator to invert a polarity of the filtered voltage signal when the polarity of the filtered voltage signal is negative.

10. The TSC of claim 9, wherein each of the m+n transmitters is configured to charge its associated line sensor of the m X-axis line sensors and the n Y-axis line sensors substantially simultaneously with the other m+n transmitters.

11. The TSC of claim 9, wherein each of the m+n receivers is configured to sense its associated line sensor of the m X-axis line sensors and the n Y-axis line sensors substantially simultaneously with the other m+n receivers.

12. The TSC of claim 9, wherein the filter includes a sample-and-hold amplifier.

13. The TSC of claim 9, wherein the integrator is configured to:
convert the polarity of the voltage signal into positive in response to control of the polarity detection circuit when the polarity of the filtered voltage signal is negative; and
accumulate the converted voltage signal.

14. The TSC of claim 9, wherein the integrator is configured to generate a capacitive profile using the accumulated voltage signal.

15. The TSC of claim 9, wherein the filter includes an anti-aliasing filter.

16. A user-interactive device comprising:
a touch panel including a plurality of X-axis line sensors and a plurality of Y-axis line sensors; and
a touch analog front end (AFE) comprising:
a plurality of transmitters, each configured to charge one of the plurality of X-axis line sensors and a plurality of Y-axis line sensors; and
a plurality of receivers, each configured to sense one of the plurality of X-axis line sensors and a plurality of Y-axis line sensors, wherein each receiver comprises:
a charge-to-voltage (C2V) converter configured to convert an amount of change of capacitance received from the associated line sensor of the touch panel into a voltage signal;
a filter configured to filter a noise from the voltage signal, resulting in a filtered voltage signal;
an integrator configured to accumulate the filtered voltage signal; and
a polarity detection circuit configured to monitor the filtered voltage signal and to control the integrator to invert a polarity of the filtered voltage signal when it is detected to be negative.

17. The device of claim 16, wherein each of the m+n transmitters is configured to charge its associated line sensor of the m X-axis line sensors and the n Y-axis line sensors substantially simultaneously with the other m+n transmitters.

18. The device of claim 16, wherein each of the m+n receivers is configured to sense its associated line sensor of the m X-axis line sensors and the n Y-axis line sensors substantially simultaneously with the other m+n receivers.

19. The device of claim 16, wherein the filter includes a sample-and-hold amplifier.

20. The device of claim 16, wherein the integrator is configured to:
convert the polarity of the voltage signal into positive in response to control from the polarity detection circuit when the polarity of the filtered voltage signal is negative; and
accumulate the converted voltage signal.

* * * * *